US011658863B1

(12) United States Patent
Salinas et al.

(10) Patent No.: US 11,658,863 B1
(45) Date of Patent: *May 23, 2023

(54) AGGREGATION OF INCIDENT DATA FOR CORRELATED INCIDENTS

(71) Applicant: Splunk Inc., San Francisco, CA (US)

(72) Inventors: Govind Salinas, Sunnyvale, CA (US); Sourabh Satish, Freemont, CA (US); Robert John Truesdell, Wexford, PA (US)

(73) Assignee: Splunk Inc., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/497,760

(22) Filed: Oct. 8, 2021

Related U.S. Application Data (63) Continuation of application No. 16/120,010, filed on Aug. 31, 2018, now Pat. No. 11,218,357.

(51) Int. Cl.
   *H04L 41/0631* (2022.01)
   *H04L 43/0817* (2022.01)
   *H04L 9/40* (2022.01)

(52) U.S. Cl.
   CPC ...... *H04L 41/0631* (2013.01); *H04L 43/0817* (2013.01); *H04L 63/1441* (2013.01)

(58) Field of Classification Search
   CPC ............. H04L 41/0631; H04L 43/0817; H04L 63/1441
   USPC .......................................................... 709/224
   See application file for complete search history.

(56) References Cited

U.S. PATENT DOCUMENTS

| | | | |
|---|---|---|---|
| 8,719,935 B2 | 5/2014 | Polyakov et al. | |
| 2007/0180107 A1 | 8/2007 | Newton et al. | |
| 2007/0192474 A1 | 8/2007 | Decasper et al. | |
| 2007/0266138 A1* | 11/2007 | Spire ................... | H04L 63/1416 709/223 |
| 2009/0070459 A1 | 3/2009 | Cho et al. | |
| 2009/0254970 A1 | 10/2009 | Agarwal et al. | |
| 2012/0185945 A1 | 7/2012 | Andres et al. | |
| 2013/0074185 A1* | 3/2013 | McDougal ............ | G06F 21/561 726/24 |
| 2013/0260745 A1* | 10/2013 | Johansson ............. | H04W 76/19 455/423 |
| 2014/0047108 A1* | 2/2014 | Tse .......................... | H04L 41/06 709/224 |
| 2015/0135316 A1 | 5/2015 | Tock et al. | |
| 2015/0264083 A1 | 9/2015 | Prenger et al. | |
| 2016/0330226 A1* | 11/2016 | Chen ....................... | H04L 63/14 |

(Continued)

OTHER PUBLICATIONS

Advisory Action, U.S. Appl. No. 16/120,010, dated Jul. 15, 2021, 3 pages.

(Continued)

*Primary Examiner* — Meng Vang
(74) *Attorney, Agent, or Firm* — Nicholson De Vos Webster & Elliott LLP (57) ABSTRACT

Described herein are systems, methods, and software to enhance incident response for an information technology (IT) environment. In one implementation, an incident service identifies an incident in the IT environment and determines a correlation between the incident and other incidents in the IT environment. Once correlated, the incident service aggregates incident data of the incident with incident data of the other incidents and generates a summary using the aggregated incident data.

20 Claims, 8 Drawing Sheets

(56) References Cited

U.S. PATENT DOCUMENTS

2017/0272453 A1 9/2017 Murray et al.
2018/0309772 A1* 10/2018 Song ..................... H04L 63/101

OTHER PUBLICATIONS

Final Office Action, U.S. Appl. No. 16/120,010, dated Jun. 1, 2021, 26 pages.
Final Office Action, U.S. Appl. No. 16/120,010, dated Jun. 24, 2020, 27 pages.
Non-Final Office Action, U.S. Appl. No. 16/120,010, dated Jan. 6, 2020, 20 pages.
Non-Final Rejection dated Dec. 8, 2020 for U.S. Appl. No. 16/120,010.
Notice of Allowance, U.S. Appl. No. 16/120,010, dated Aug. 4, 2021, 8 pages.

* cited by examiner

| ▼ | Events ID: 1004 Zeus infection on HQ finance server | HIGH | TLP: WHITE | SLA: ● Exceeded by 3 days | More ▼ | | | Owner Alex Andreas ▼ | Set Status Open ▼ |
|---|---|---|---|---|---|---|---|---|---|

| ACTIVITY | GUIDANCE | Timeline | HUD | Artifacts ▼ | Vault | Approvals | Reports | | ▲ACTION ▲PLAYBOOK +ARTIFACTS |
|---|---|---|---|---|---|---|---|---|---|

● MISSION GUIDANCE

| | ▼ID | LABEL | TIME | SEVERITY | SOURCE ID | SOURCE ADDRESS | DIST | FILEHASH | DESTINATION PORT |
|---|---|---|---|---|---|---|---|---|---|
| ■ ⊖ | 1361 | event | Tue at 07:27PM | HIGH | 7lkey3pShcpNASA... | 10.17.1.201 ▼ | 103.230.84.239 ▼ | 5102039050ecc8cf704567563... | 80 ▼ |
| ■ ⊖ | 1360 | event | Tue at 07:27PM | HIGH | eoIZBWavLdt6KIX... | 10.17.1.201 ▼ | 103.230.84.239 ▼ | 5102039050ecc8cf704567563... | 80 ▼ |
| ■ ⊖ | 1359 | event | Tue at 07:27PM | MEDIUM | iaDeHOFAJFh2gd... | 10.17.1.201 ▼ | 103.230.84.239 ▼ | 5102039050ecc8cf704567563... | 80 ▼ |
| ■ ⊖ | 1358 | event | Tue at 07:27PM | LOW | HtBayVPvfgS7Mz... | 10.17.1.201 ▼ | 103.230.84.239 ▼ | 5102039050ecc8cf704567563... | 80 ▼ |
| ■ ⊖ | 1357 | event | Tue at 07:27PM | LOW | uAh2nreMbgbzKo... | 10.17.1.201 ▼ | 103.230.84.239 ▼ | 5102039050ecc8cf704567563... | 80 ▼ |
| ■ ⊖ | 1356 | event | Tue at 07:27PM | HIGH | RvtaX96mMtLJPM... | 10.17.1.201 ▼ | 103.230.84.239 ▼ | 5102039050ecc8cf704567563... | 80 ▼ |
| ■ ⊖ | 1355 | event | Tue at 07:27PM | MEDIUM | 2j68iJIerwPrsqXE9... | 10.17.1.201 ▼ | 103.230.84.239 ▼ | 5102039050ecc8cf704567563... | 80 ▼ |
| ■ ⊖ | 1354 | event | Tue at 07:27PM | HIGH | CIVxXD8Xo2uqjax... | 10.17.1.201 ▼ | 103.230.84.239 ▼ | 5102039050ecc8cf704567563... | 80 ▼ |

MISSION EXPERTS

No experts

PLAYBOOKS   2 of 5 completed
⊘ local/example
⊘ Community/Invest
⊘ qatest/phapp_wlgle
⊘ qatest/phapp_wlnrm Widgets   Notes                                                                                              Show 10 ▼   COLLAPSE ▽ VirusTotal

| Results | Hash | Detections | Scanner |
|---|---|---|---|
| 40% | 5102039F045... | 58 | 64 |
| Detection Ratio | 5105E8CF045... | 58 | 64 |
| 30  12  12 | 5102038F045... | 58 | 64 |
| Queried Found Detected | 5102039S805... | 0 | 0 |
| | 5102058CF0... | 0 | 0 |
| | 3905E8CF045... | 0 | 0 |

> hunt file
  5102039050ecc
> hunt ip

| | HOST NAME | CONNECTOR GUID | ACTIVE | SHA256 HASH |
|---|---|---|---|---|
| | None | None | None | 5102039050ecc8cf705675... |
| | None | None | None | 5102039050ecc8cf7045675... |
| | None | None | None | 5102039050ecc8cf704563... |

〈 ① 2 〉                                                          MANAGE WIDGETS

ACTIONS   5 of 5 completed
⊘ Geolocate ip
  maxmind
⊘ whois ip
  whois
⊘ ip reputation
  passivetotal

SUGGESTIONS PORTION 502

SUMMARY PORTION 504

FIGURE 5B

SUGGESTIONS PORTION 502

SUMMARY PORTION 504

FIGURE 6

AGGREGATION OF INCIDENT DATA FOR CORRELATED INCIDENTS

CROSS-REFERENCE TO RELATED APPLICATION

This application claims benefit under 35 U.S.C. § 120 as a continuation of U.S. application Ser. No. 16/120,010, filed Aug. 31, 2018, the entire contents of which are hereby incorporated by reference as if fully set forth herein. Applicant hereby rescinds any disclaimer of claim scope in the parent application, or in the prosecution history thereof, and advises the USPTO that the claims in this application may be broader than any claim in the parent application.

TECHNICAL BACKGROUND

Information technology (IT) environments often employ various computing components, both physical and virtual, to provide desired operations. These computing elements may include end user computing devices, host computing devices, virtual machines, switches, routers, firewalls, and the like. To maintain efficient and effective operations of the IT environment, incident response services may be employed that can respond to various incidents within the IT environment. These incidents may include or be associated with viruses, malware, spyware, denial of service attacks, phishing attacks, server crashes, device failures, power outages, unknown communications, or some other similar incident.

However, while incident response services provide response operations to incidents within the IT environment, difficulties arise as the size and complexity of the IT environment increases. These difficulties are often compounded when the new computing components provide different operations and are configured with varying hardware and software configurations. Further, the increasing number computing components in combination with limited administrative personnel and resources can make it difficult to manage the investigation and remediation of incidents in the environment. Even with ample administrators or analyst users, it can be cumbersome to coordinate the investigation and remediation efforts.

SUMMARY

Described herein are improvements for incident response in an information technology (IT) environment. In one example, an incident service can identify an incident in the IT environment and determine other incidents that share traits with the identified incident. Once the other incidents are identified, the incident service can aggregate data associated with the incident with data for the other incidents and generate a summary based on the aggregated data. In some implementations, the summary may be used to efficiently combine incident data for multiple incidents, permitting efficient response to multiple incidents in the IT environment.

BRIEF DESCRIPTION OF THE DRAWINGS

FIGS. 5A-5B illustrate an example user interface for displaying a summary notification according to an implementation.

DETAILED DESCRIPTION

Figure 1:
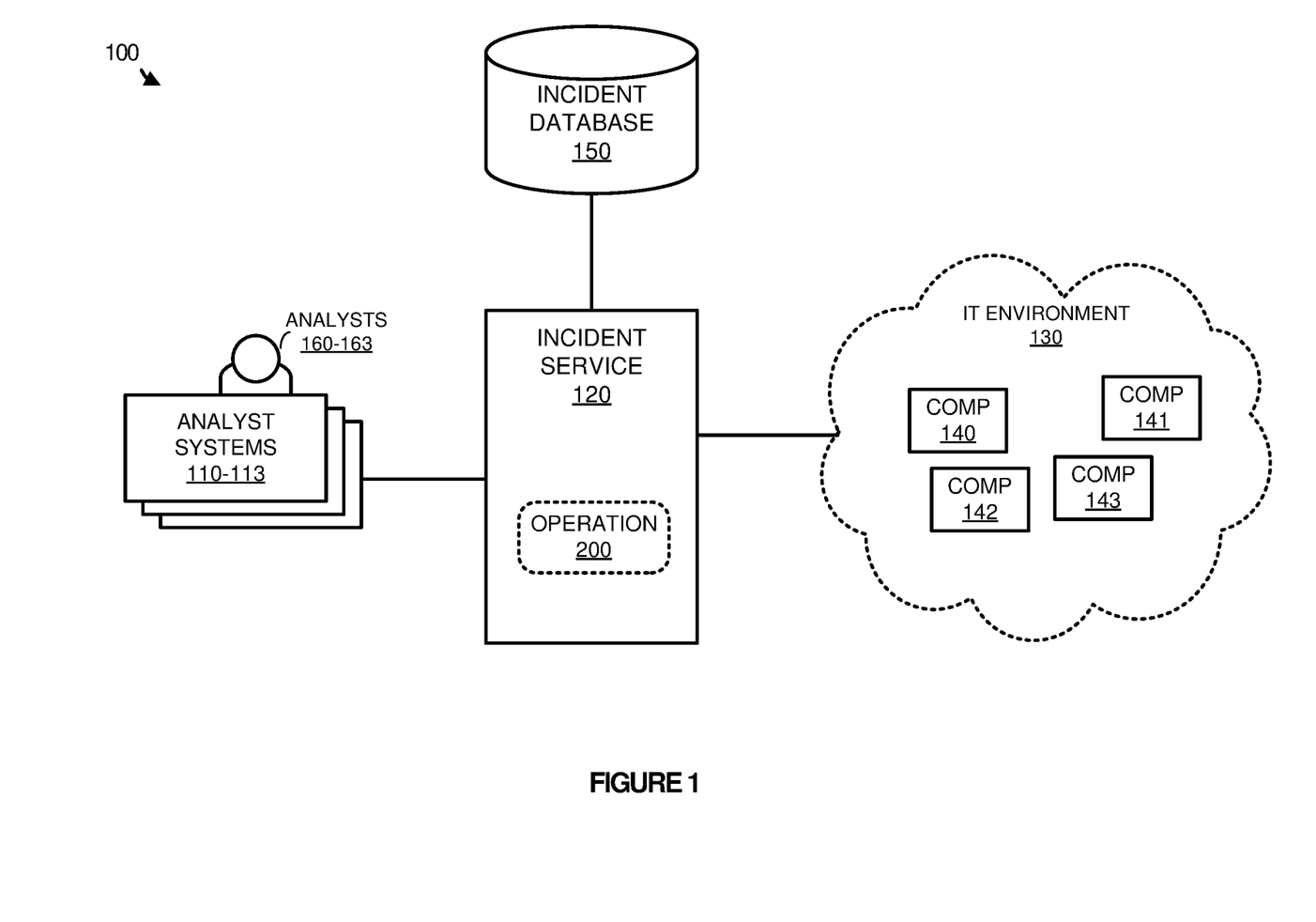
FIG. 1 illustrates an example of a computing environment according to an implementation.

FIG. 1 illustrates an example 100 of a computing environment according to an implementation. Example 100 includes analyst systems 110-113, incident service 120, incident database 150, and information technology (IT) environment 130. IT environment 130 further includes components 140-143, wherein components 140-143 may comprise physical computing systems, virtual computing systems, routers, switches, firewalls, or some other similar types of computing elements, including combinations thereof. Incident service 120 provides operation 200 that is further described in FIG. 2.

In operation, components 140-143 function in network 130 to provide various services and functionality. The services and functionality may include operations for performing as an end user computing system, a server computing system, a host for one or more virtual machines, a virtual machine itself, a switch, a router, or some other similar operation in the IT environment. During the operation of components 140-143, the components may encounter incidents, wherein the incidents may comprise or be associated with viruses, malware, spyware, denial of service attacks, phishing attacks, server crashes, device failures, power outages, unknown communications, or some other similar incident. To respond to the incidents, incident service 120 is provided that identifies the incident and provides a platform to respond to the incident. In at least one implementation, incident service 120 may generate courses of action with sequences of one or more steps, wherein the courses of action and the various steps may be used to mitigate, monitor, remove, or provide any other similar operations to remediate, correct, or otherwise respond to the incident.

In some examples, while not illustrated in example 100, incident service 120 may be communicatively coupled to security and event management (SIEM) services and/or monitoring and analytics services that are used to automate the identification of incidents within IT environment 130. In other implementations, incident service 120 may implement the SIEM services and other monitoring and analytics services as part of the operations of the computing environment. As an example operation for a SIEM service, if an unknown process were operating on component 140, the SIEM service may identify the incident and provide information about the incident to incident service 120. The information or data for the incident may include the name of the unknown process, the source of the process, any credential or licensing information about the unknown process, the component identifier for the component associated with the incident, or any other similar information about the incident.

In some implementations, in addition to or in place of the automated identification of an incident in IT environment 130, incident service 120 may employ a "ticket" system, wherein users and analysts of the environment may report incidents. For example, when an email is received from an unknown source seeking personal information, the receiving user of the email may report the email as an incident such that incident service 120 may process the incident. When reported, the end user may provide information about the incident, however, automated processes may identify additional information for the incident, such as a source domain for the email, specific content or links within the email, or some other similar information that may assist incident service 120 in responding to the incident. This additional information may be determined from local databases or may be gathered from internet resources such as web services and other similar resources.

Once an incident is identified, a course of action may be selected to respond to the incident. These courses of action may be selected in an automated manner by incident service 120 or may be selected by an analyst of analysts 160-163. In at least one implementation, in selecting a course of action to respond to an incident, incident service 120 may generate and provide summaries to a responding analyst, wherein the summaries provide information about the incident. This information may include relevant IP addresses, processes, files, threat levels, incident type information, components associated with the incident, or some other type of information related to the incident. Here in addition to providing information about an incident, incident service 120 may further correlate the currently identified incident with one or more other incidents and aggregate the incident data across the correlated incidents. Once aggregated, incident service may provide at least a portion of the aggregated incident data as a summary to the responding analyst, permitting the analyst to select actions to respond to multiple incidents as opposed to a single incident. Further, it provides the analyst with additional information about the incidents, as incident data associated with a first incident may not provide the same information as incident data associated with a second incident, even though the two incidents are correlated.

Figure 2:
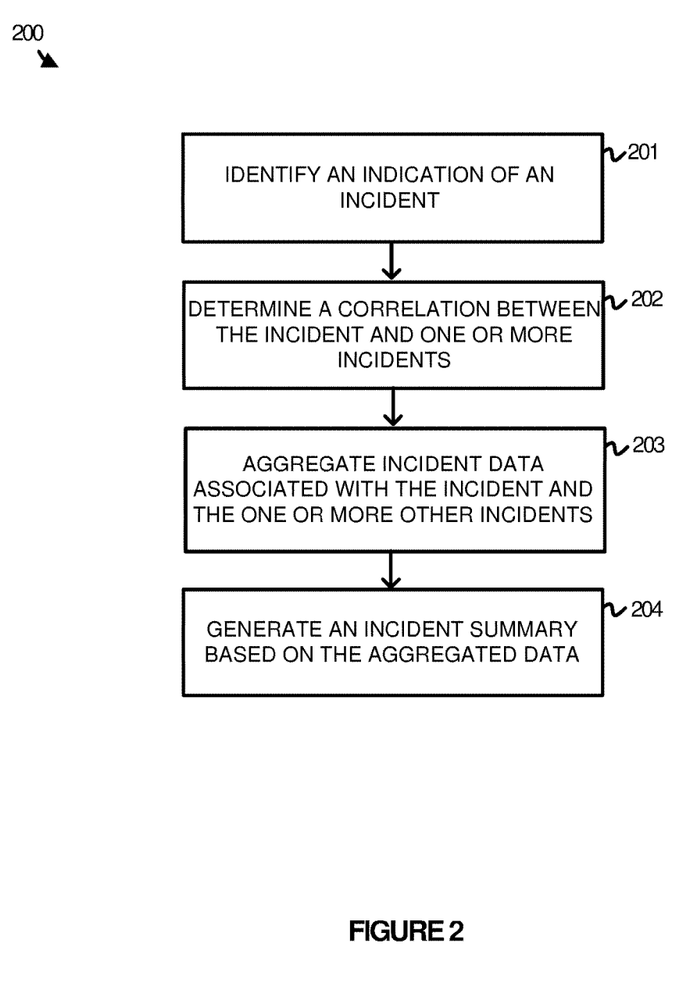
FIG. 2 illustrates an example operation of an incident service according to an implementation.

FIG. 2 illustrates an example operation 200 of an incident service according to an implementation. The processes of operation 200 are referenced parenthetically in the paragraphs that follow with reference to systems and elements of example 100 of FIG. 1.

As depicted, operation 200 includes identifying (201) an indication of an incident, wherein incident service 120 may identify the incident or may rely on various SIEM or other monitoring services to provide a notification of the incident. In response to identifying the incident, incident service 120 may determine (202) a correlation between the incident and one or more other incidents identified in IT environment 130. In identifying the correlation, incident service 120 may compare a subset of data values associated with the current incident and data values associated with other incidents that were previously identified for IT environment 130. As an example, when comparing the current incident, the incident service may match at least a portion of the incident data associated with the current incident with at least a portion of the incident data associated with the one or more other incidents and determine whether the matched data meets matching criteria. The data used in correlating incidents may include IP addresses associated with the incidents, domain names associated with the incidents, component identifiers, user identifiers, incident types, file types, file extensions, file sizes, executable process identifiers, email addresses, user profiles, types of computing components associated with the incident, component failure indications, network vulnerability indications, service interruption indications, power outage indications, some other similar data attribute associated with the incidents. In some examples, in matching the data between incidents, incident service 120 may access incident database 150, wherein incident database 150 may cache incident data for previously identified incidents in IT environment 130. In correlating the current incident to one or more other incidents, incident service 120 may compare incident data for the current incidents to other incidents that occurred within a proximity time period to the current incident, to incidents that have not been responded to or have been resolved, or some other subset of the total incidents identified in IT environment 130.

In some implementations, in addition to or in place of matching data values between incidents, incident service 120 may be configured with correlation parameters, wherein an analyst may provide user input indicating parameters of interest to correlate various incidents. For example, an analyst may correlate incidents that originate from the same country and use the same communication protocol. Accordingly, whenever a new incident is identified, the country of origin may be identified along with the communication protocol and compared to the correlation parameters to determine if the incident should be classified with other incidents that meet the same correlation parameters. In at least one implementation, in defining the correlation parameters the analyst or administrator may use Boolean functions, wherein incident data for an incident may be applied to the Boolean functions to determine whether the function is satisfied. If satisfied, the incident may be correlated with other incidents that also satisfied the same Boolean function.

Once a correlation is identified between the incident and the one or more other incidents, incident service 120 aggregates (203) incident data associated with the incident with incident data associated with the one or more other incidents. In aggregating the incident data, data values may be summed, combined, or otherwise collected into an aggregated data set for the incident and the one or more other incidents. As an example, an incident data point may indicate the quantity of packets received from an IP address. During the aggregation process, the quantity of packets may be summed with quantities of packets received from the same or similar IP addresses as part of other identified incidents.

After aggregating the incident data for the incident and the one or more other incidents, incident service 120 may generate (204) an incident summary based on the aggregated data. In some implementations, the incident summary may indicate updated information regarding the correlated incidents. For example, if analyst 160 of analysts 160-163 were responding to the one or more other incidents, a summary may be generated that indicates one or more values that were modified based on the newly identified incident. For instance, incident service 120 may generate the summary that indicates an update to the quantity of incidents identified with similar attributes, information about the component or user affected by the newly identified incident, any modified values (total packets transferred, components affected, etc.). Thus, if an incident corresponded to a power failure, the summary generated may indicate a current quantity of components affected by power failure, the location or locations of the power failures, or some other similar information about the incidents.

In some implementations, incident service 120 may use the aggregated data to identify an incident type, wherein the incident type may comprise an unknown process, a virus, malware, spyware, a denial of service attack, a phishing attack, a server crash, a device failure, a power outage, or some other similar incident type. This incident type may be based on at least a subset of the aggregated incident data. In some implementations, incident service 120 may select an analyst from analysts 160-163 to respond to the incident based on the incident type and generate a notification for the identified analyst based on the generated summary, wherein the notification may include the full summary, or at least a portion of the summary. This notification may indicate the type of incident, at least a subset of the aggregated data, or any other similar information for the incident. In some implementations, the notification may further include information about any other analysts responding to a correlated incident. In some implementations, rather than selecting an analyst based on the incident type, incident service 120 may identify at least one analyst that corresponds to the one or more other incidents. As an example, analyst 160 may be allocated to respond to the one or more other incidents prior to the identification of the current incident. Once the current incident is identified, incident service 120 may identify analyst 160 to respond to the current incident based on the similar incident previously allocated to analyst 160. After selection of the analyst, incident service 120 may generate a notification that includes at least a portion of the summary for display to the selected analyst.

In some examples, analysts 160-163 may dynamically select when correlations should be identified by incident service 120. In one implementation, an analyst or administrator associated with incident service 120 and IT environment 130 may provide input indicating whether any correlations should be generated for incidents identified in IT environment 130. In another implementation, an analyst or administrator may provide input indicating that correlations should only be made for incidents related by specific traits, incident types (e.g. device failure, denial of service attacks, or some other similar incident type), component identifiers, component types, or some other similar trait. Similarly, an analyst or administrator may provide input indicating that correlations should not be made for incidents related by specific traits. Further, in some implementations, an administrator may define that correlations may only be identified for incidents that share a common state. Accordingly, if a new incident, classified as active in IT environment 130, shared incident data with a second incident, classified as closed (i.e., no longer considered active), the new incident may not be correlated to the second incident. Alternatively, an analyst or administrator may define that correlations may be identified between incidents that are different states. Returning to the example of a new incident sharing incident data with a second incident in a close state, when the events are correlated, incident service 120 may change the state of at least one of the incidents. Thus, as an example, when a new incident is identified and shares incident data with a closed incident, the closed incident may be changed to an active state incident and correlated to the new incident.

Figure 3A:
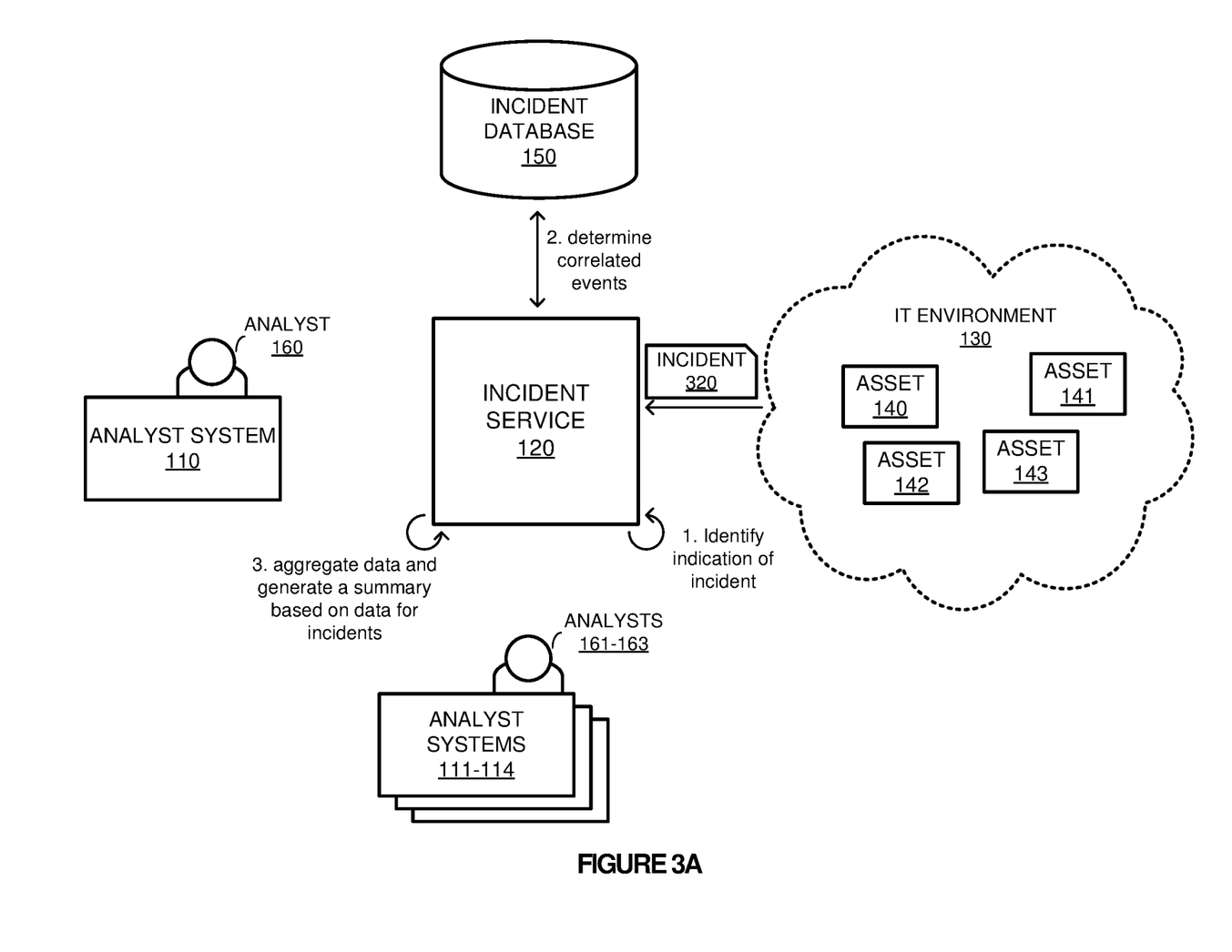
FIGS. 3A-3B illustrate an example operational scenario of aggregating incident data according to an implementation.
Figure 3B:
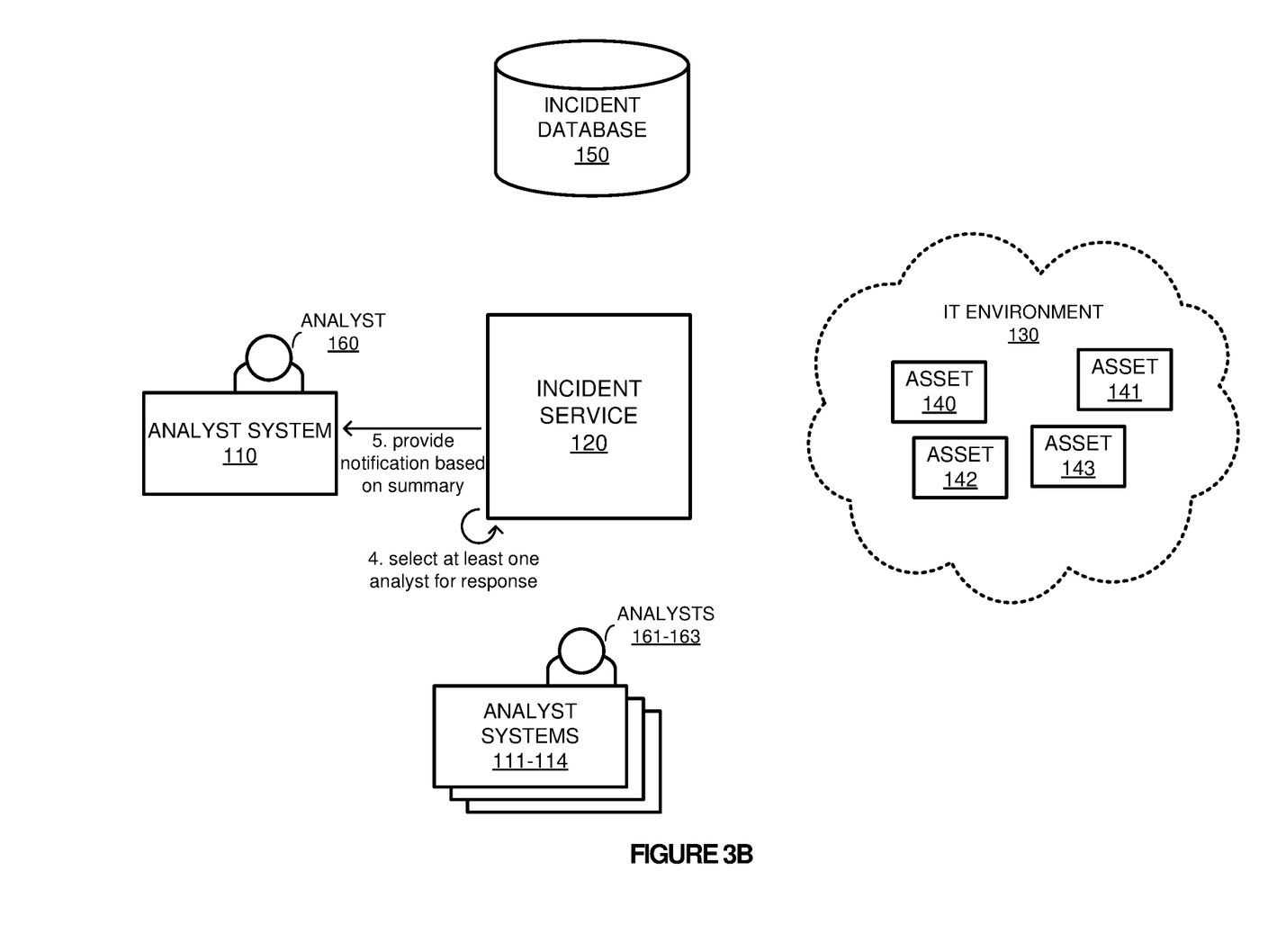

FIGS. 3A-3B illustrate an example operational scenario of aggregating incident data according to an implementation. The operational scenario of FIGS. 3A-3B include systems and elements from example 100 of FIG. 1, and further includes incident 320 identified from IT environment 130.

Referring to FIG. 3A, incident service 120 identifies, at step 1, an indication of incident 320 for IT environment 130. In some implementations, the indication may be provided by a SIEM or other monitoring service capable of identifying incidents within IT environment 130 and capable of providing information about incident 320 to incident service 120. In other implementations, incident service 120 may implement its own monitoring service or may obtain information about incidents via tickets from one or more users associated with IT environment 130. In response to identifying the indication of the incident, incident service 120 determines, at step 2, correlated incidents to incident 320. In some examples, to determine the correlated incidents, incident service 120 may access incident database 150, wherein incident database 150 may maintain information about other incidents associated with IT environment 130. Incident service 120 may maintain the information for incident database 150 or may rely on other services and systems to update incident database 150. In some implementations, as incidents are identified, data for the incidents may be stored in incident database 150 such that the data can be compared to later incidents identified in IT environment 130. Accordingly, when incident 320 is identified, incident service 120 may access incident database 150 to compare at least a portion of the data associated with incident 320 with the incident data for previously identified incidents.

In some examples, in determining whether two incidents are correlated, incident service 120 may determine whether a portion of the data associated with incident 320 matches a portion of the data of another incident. In one implementation, to qualify as correlated incidents, the matched data portions may comprise specific attributes (e.g. geolocation of an IP address associated with each incident, component associated with each incident, domain associated with each incident, the incident type for the incident, or some other similar attribute, including combinations thereof). Thus, as an example, incident service 120 may determine that incidents are correlated when source IP addresses for the incidents correspond to the same source. In other implementations, to qualify as correlated incidents, incident service 120 may consider the quantity of data that matches between incidents, such as the quantity of fields (quantity of incident data values) that match between two incidents. When the quantity satisfies a threshold, incident service 120 may correlate the two incidents.

In some examples, correlation parameters may be generated that can be used by incident service 120 in determining whether two incidents should be correlated. These correlation parameters may be defined in the form of Boolean expressions, such that when incident service 120 determines that the data for two incidents satisfies the Boolean expression, the two incidents will be classified as correlated incidents. As an example, correlation parameters may provide that incidents that share a source IP address and a protocol of interest should be classified as correlated incidents. As a result, when incidents match or satisfy the correlation parameters, the incidents may be classified with other incidents that also matched the same correlation parameters. In some embodiments, incident service 120 may be capable of supporting multiple correlation parameters, wherein each of the correlation parameters may correspond to a different Boolean function. Thus, when an incident is identified, the incident may be compared to each of the functions to determine which previously identified incidents should be correlated to the current incident.

In some implementations, to identify a correlation, incident service 120 may generate a query to incident database 150, wherein incident database 150 may comprise a system that can execute operations against previously observed incidents as well as logs, metrics, and sensor data of IT environment 130 to identify similar incidents. In at least one example, incident service 120 may provide incident data about a currently identified incident, and incident database 150 may identify related logs, metrics, and sensor data related to the current incident. Thus, the currently identified incident may be correlated to incidents that were previously identified and may further be correlated to incidents that were yet to be identified. For example, incident database 150 may identify a communication log with a previous communication related to the current incident. Once identified, incident database 150 may classify the previous communication as a second incident and correlate the second incident to the current incident. Advantageously, this permits a current incident to be correlated to data that was already defined as an incident and may further be correlated to data that was not yet classified as an incident.

Once incident 320 is correlated to one or more other incidents, incident service 120 may aggregate, at step 3, incident data associated with incident 320 with incident data associated with the one or more other incidents, and generate a summary based on the aggregated incident data. In some implementations, in aggregating the data, incident service 120 may generate the aggregated data set by summing data values from incident 320 and the other correlated incidents, combine the data values into a single data value or list of data values, or provide any other similar operation to generate an aggregated. Once the data is aggregated, incident service 120 may generate a summary using all, or portions of, the aggregated data. This summary may be generated in the form of a data structure or structures, images, text, or some other similar format for summarizing at least a portion of the aggregated data.

Turning to FIG. 3B, in addition to generating a summary, incident service 120 may further select, at step 4, at least one analyst to respond to incident 320. In at least one example, in selecting the analyst, incident service 120 may determine an incident type and allocate the incident to one or more analysts that correspond to the incident type. In other implementations, the analyst may be selected based on the analyst that corresponded to the one or more other incidents that correlated to incident 320. In this manner, an analyst that is currently responding or has previously responded to the one or more other incidents may be provided with aggregated data to respond to at least incident 320 and the one or more other incidents. Once selected, incident service 120 may generate and cause display of a notification to the analyst, at step 5, wherein the notification may include at least a portion of the information from the generated summary. The notification may comprise a text message, an email, an audio alert, a pop-up window or some other similar notification capable of presentation to analyst 160 via analyst system 110.

Once the notification is displayed for the associated analyst, the analyst may respond to the incident based on the aggregated information provided in the summary. In some implementations, in responding to the incident, analyst 160 may select or generate a course of action that provides sequencing information for one or more steps to respond to an incident. These steps may be used to gather additional information about an incident (geolocation of IP addresses, file reputations, domain reputations, and the like), may be used to monitor the incident, may be used to modify configurations in IT environment 130, or may provide any other similar operation with respect to responding to the incident. As an example, a course of action may obtain geographic location information for an IP address, determine whether the address corresponds to a particular country of origin, and initiate a firewall operation based on whether the address corresponds to the particular country. In some examples, analyst 160 may select the course of action from a database of available courses of action. In other examples, analyst 160 may select the various steps of the course of action to define the sequencing of the steps in responding to the incident.

In at least one implementation, in responding to the incident, the course of action may respond to at least a portion of the one or more other correlated incidents in addition to currently identified incident 320. As an example, an unknown process to be removed from a component associated with incident 320 and may further be removed from other components associated with the other incidents. Further, in some implementations, analyst 160 may be provided with course of action suggestions, wherein the course of action suggestions may comprise suggestions to respond to incident 320, the one or more other incidents, or some subset thereof. These suggestions may be based on the incident type, the component or components identified with the incident, or some other similar information related to the incident. From the suggestions, analyst 320 may select one or more courses of action to be implemented against the incident. In at least one implementation, in addition to or in place of providing suggested actions to an analyst, incident service 120 may automate a response (course of action) to at least incident 320 and one or more other correlated incidents, wherein the response may be determined based on the incident type of incident 320 and the one or more incidents, the components or user affected, or some other similar attribute associated with incident 320 and the corresponding incidents.

In some examples, analysts 160-163 or another administrator related to incident service 120 may provide input indicating that only incidents of the same state should be correlated. These states may comprise an active state, a closed state (i.e. no longer active), or some other similar state in IT environment 130. Accordingly, when two incidents share incident data, incident service 120 may not correlate the incidents if the incidents correspond to different states. Alternatively, analysts 160-163 or another administrator related to incident service 120 may indicate that incidents in different states may be correlated and may further modify the state of at least one of the correlated incidents. As an example, when an incident in a closed state is correlated to an incident in an active state, the incident in the closed state may promoted to an active state to assist in incident response.

Figure 4:
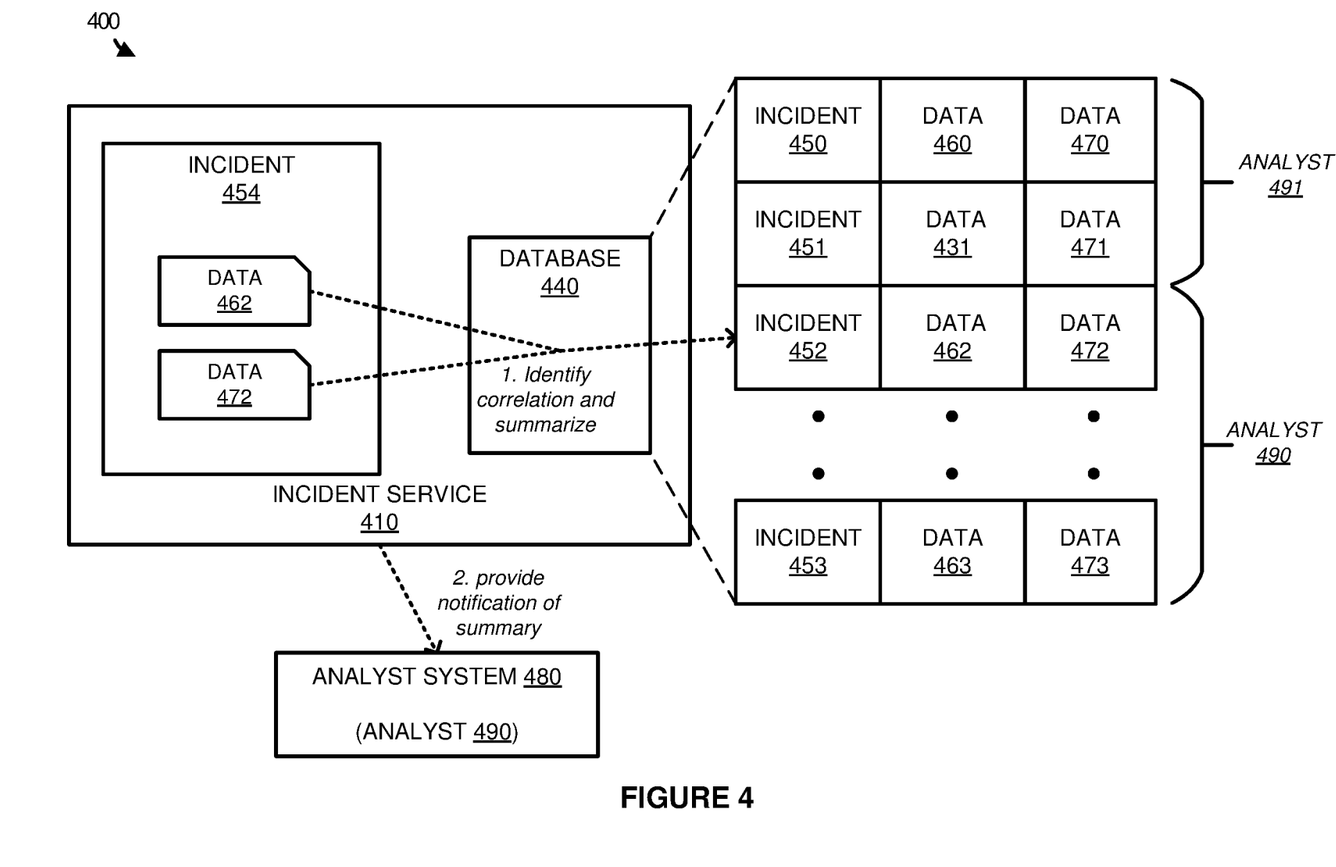
FIG. 4 illustrates an example operational scenario of identifying similar incidents according to an implementation.

FIG. 4 illustrates an operational scenario 400 of identifying similar incidents according to an implementation. Operational scenario 400 includes incident service 410 and analyst system 480 that corresponds to analyst 490. Incident service 410 further includes identified incident 454 with data 462 and 472, and further includes database 440 that stores information for incidents 450-453 and corresponding data 460-463 and 470-473.

As described herein, as incidents are identified within an IT environment, incident service 410 may be used to provide a platform to respond to various incidents in the IT environment. In the example of operational scenario 400, incident service 410 identifies information about incident 454, wherein incident 454 corresponds to incident data 462 and 472. In some implementations, incident data 462 and 472 may be obtained via the SIEM or other monitoring service for the IT environment, however, incident service 410 may identify incident data 462 and 472 using a course of action or actions, wherein steps of the course of action may obtain data 462 and 472 from supplementary sources that include external websites and databases. For example, a course of action may be used to determine geographic location information corresponding to an IP address related to the incident, wherein the course of action may query a web service to determine the geographic location information.

Once incident 454 is identified with the corresponding data, incident service 410 identifies, at step 1, related incidents from database 440. In some implementations, database 440 may be managed by incident service 410, however, one or more other services may maintain database 440 from previous incidents identified in the IT environment. As the database is maintained, incident service 410 may access database 440 and match at least a subset of the data for the newly incident with other incidents that were previously identified. In some implementations, incident service 410 may match specific data value types with data value types of the other incidents. When matched, incident service 410 may classify the incident as correlated with the previously identified incident. Here, data 462 and 472 is matched to the data of incident 452. As a result, incident service may classify incident 454 as correlated with incident 452. Once the incidents are correlated, incident service 410 may summarize the incidents, such that information about the incidents may be provided to analyst 490.

In some implementations, once the summary is generated, incident service 410 provides, at step 2, a notification associated with the summary to analyst 490. In selecting the analyst to receive the notification or respond to the incident, summary service 410 may consider various factors including the analysts that are in the process of responding to or have responded to the previously identified incident or incidents, the incident type associated with the incident, the success rate of the analysts in responding to incidents, or some other similar factor including combinations thereof. The notification to the analyst may include at least a subset of the information from the summary and may be provided as a popup notification, an email, a text message, or some other similar notification.

Once the notification is provided to the analyst, the analyst may respond to the incident using one or more courses of action, wherein the courses of action define sequencing and flows for steps that can be used in responding to the incidents. These steps may be used to obtain information from website databases or services, implement actions to monitor the incident or incidents, implement configuration modifications in one or more computing elements, or provide some other similar operation. The actions may be used to respond to the currently identified incident and may further be used to respond to the other correlated incidents. As an example, when incident 454 is correlated with incident 452, incident service 410 may determine an incident type associated with the incidents and select a course of action capable of responding to the incidents (blocking IP addresses at one or more components, remove processes at one or more components, and the like).

In some implementations, in addition to or in place of generating a notification for an analyst, incident service 410 may generate an automated response to an incident, wherein the automated response may correspond to at least one course of action. Further, while not demonstrated in the example of operational scenario 400, it should be understood that at least a portion of data 462 and 472 identified by incident service 410 may be obtained using a course of action capable of obtaining data from web services and databases. This obtained data may include information about geographic location information related to an IP address for the incident, file reputation information, or some other similar information related to the incident.

In some examples, in identifying similar incidents, database 440 may include information about previously identified incidents and may further include logs, metrics, and sensor data for the IT environment. In this manner, when incident 454 is identified, incident 454 may be correlated to a previously identified incident as well as to incidents that have yet to be identified. For example, logs may be used to identify communications, processes, or other similar operations that relate to the currently identified incident and, once identified, may be classified as second incidents. The second incidents may then be correlated to the current incident to generate the summary for an analyst of the IT environment.

Figure 5B:
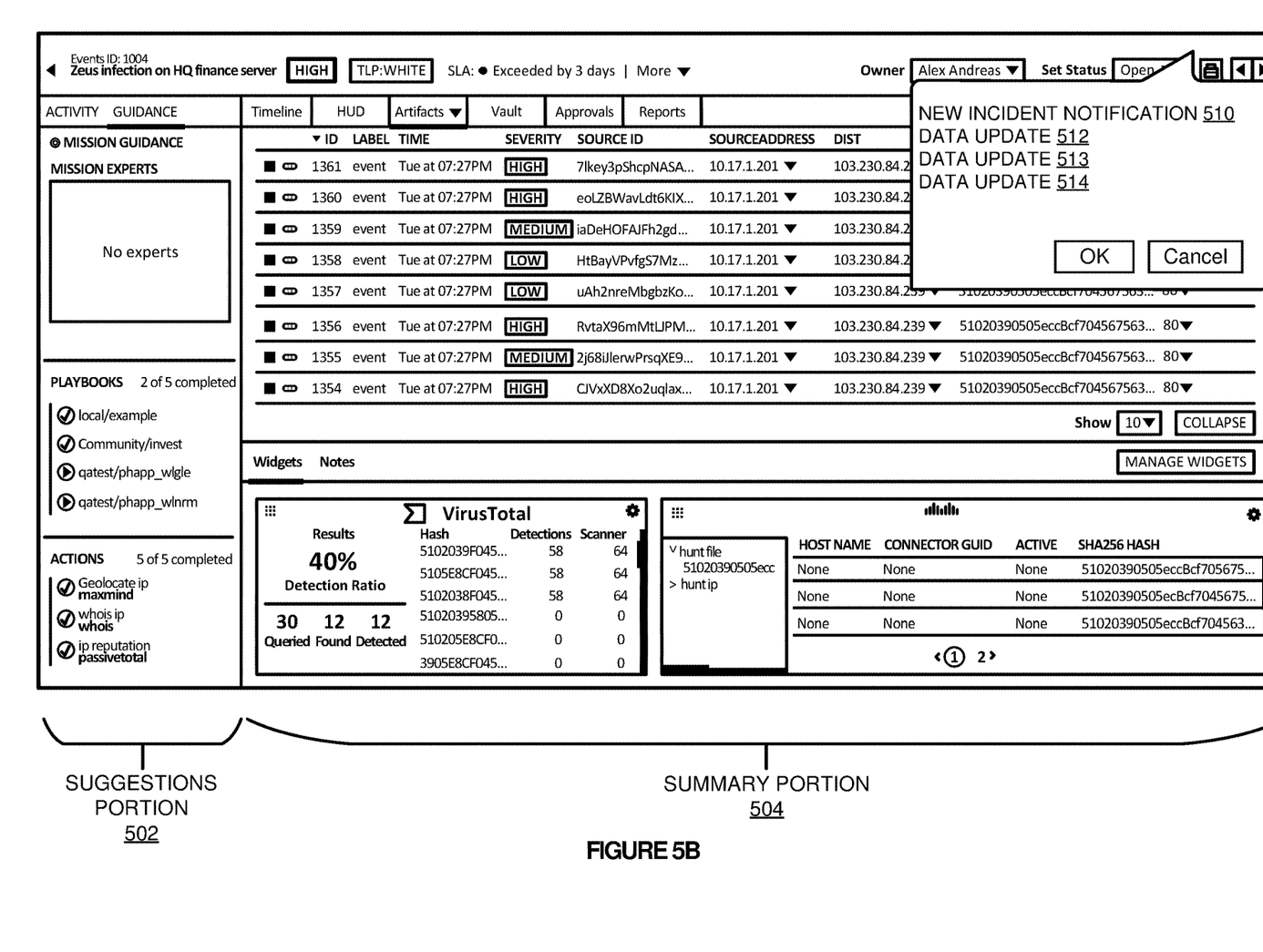

FIGS. 5A-5B illustrate a user interface for displaying a summary notification according to an implementation. FIGS. 5A-5B include suggestions portion 502 and summary portion 504. The user interface of FIGS. 5A-5B may be displayed to an analyst at an analyst system or console or may be displayed via a user interface at the incident service.

Referring first to FIG. 5A, an interface may be provided to an analyst that includes summary information about an incident or incidents demonstrated as summary portion 504, and further may include a suggestions portion 502 that provides suggestions in responding to an incident. In some implementations, summary portion 504 may include information about one or more incidents, wherein the information may indicate various data for the incidents, such as IP addresses, communication attributes, threat levels, incident type information, or some other similar information for the one or more incidents. Further, the interface may provide a suggestions portion 502 that indicates a suggestion of courses of action (playbooks) to respond to incidents and other analysts capable of responding to the incidents. These analysts and courses of action may be determined based on the type of incidents, previous analysts preferred by the current analyst, any correlated incidents to the current incident, or some other similar information related to the analyst or incident.

Turning to FIG. 5B, when an incident is identified from an IT environment, an incident service may correlate the incident to one or more other incidents based on at least a portion of the incident data associated with the incident. This correlation may be based on the incident matching incident data for other incidents or may be based on the incident data satisfying correlation parameters. These correlation parameters may be obtained via user input and comprise a Boolean function in some examples, wherein at least a portion of the data associated with the incident may be used to determine whether the Boolean function is satisfied. If satisfied, the incident may be associated with other incidents that also satisfy the same correlation parameters.

Here, when a new incident is identified, new incident notification 510 is provided that provides information about the incident and the correlated incidents. This notification may include updates to information about the correlated incidents (assets involved with the new incident, users of the new incident, and the like), any changes in the type of the incident, any quantity or value changes (quantity of components affected, quantity of packets communicated, and the like), or some other similar information. In new incident notification 510, the summary information provided in the popup notification include data updates 512-514. Although demonstrated as a popup notification in the present implementation, a notification or summary may be provided using text messages, emails, or some other similar notification platform.

Figure 6:
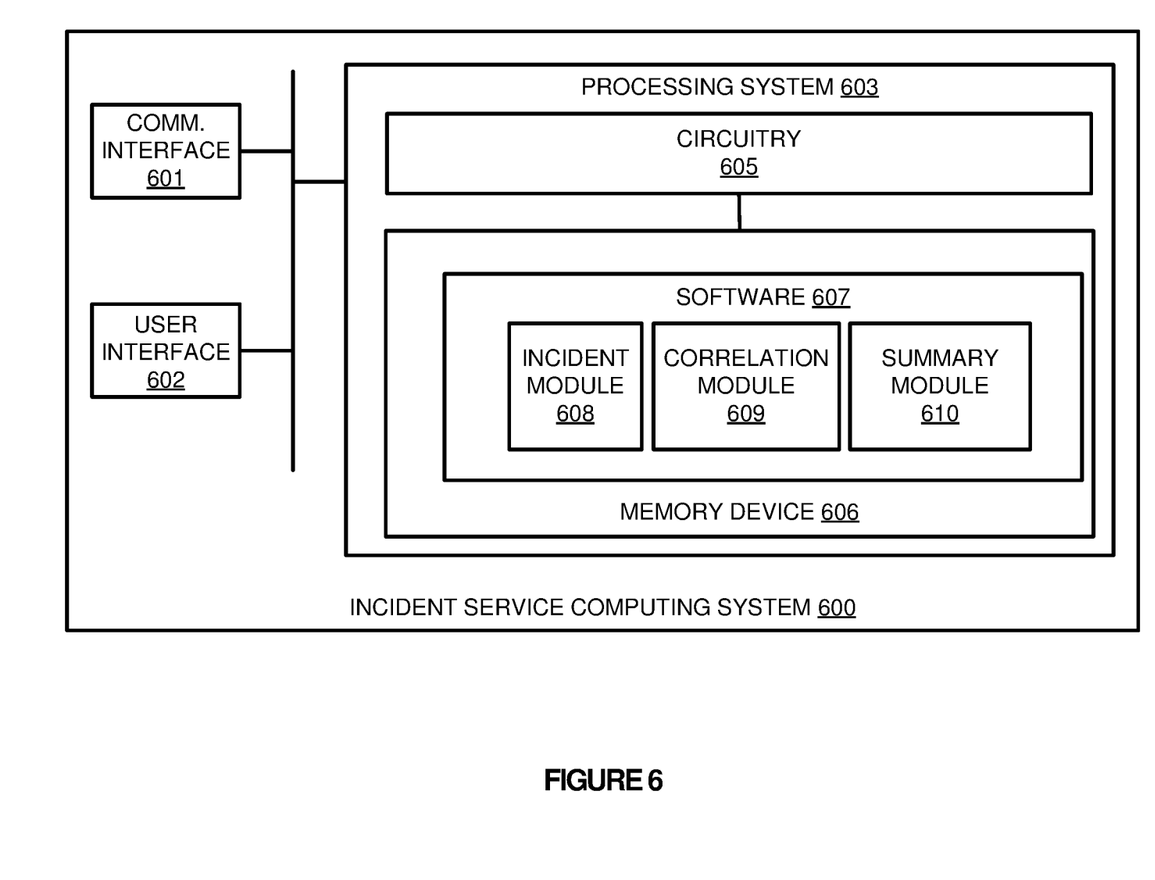
FIG. 6 illustrates an example incident service computing system according to an implementation.

FIG. 6 illustrates an incident service computing system 600 according to an implementation. Computing system 600 is representative of any computing system or systems with which the various operational architectures, processes, scenarios, and sequences disclosed herein for an incident service may be implemented. Computing system 600 is an example of incident service 120 from FIG. 1 and incident service 410 of FIG. 4, although other examples may exist. Computing system 600 comprises communication interface 601, user interface 602, and processing system 603. Processing system 603 is linked to communication interface 601 and user interface 602. Processing system 603 includes processing circuitry 605 and memory device 606 that stores operating software 607. Computing system 600 may include other well-known components such as a battery and enclosure that are not shown for clarity.

Communication interface 601 comprises components that communicate over communication links, such as network cards, ports, radio frequency (RF), processing circuitry and software, or some other communication devices. Communication interface 601 may be configured to communicate over metallic, wireless, or optical links. Communication interface 601 may be configured to use Time Division Multiplex (TDM), Internet Protocol (IP), Ethernet, optical networking, wireless protocols, communication signaling, or some other communication format—including combinations thereof. In at least one implementation, communication interface 601 may be used to communicate analyst consoles or systems, a SIEM or other similar monitoring service, and may further communicate with components within the IT environment.

User interface 602 comprises components that interact with a user to receive user inputs and to present media and/or information. User interface 602 may include a speaker, microphone, buttons, lights, display screen, touch screen, touch pad, scroll wheel, communication port, or some other user input/output apparatus—including combinations thereof. User interface 602 may be omitted in some examples. In some implementations, user interface 602 may operate as an analyst system to provide information about incidents to at least one analyst.

Processing circuitry 605 comprises microprocessor and other circuitry that retrieves and executes operating software 607 from memory device 606. Memory device 606 may include volatile and nonvolatile, removable and non-removable media implemented in any method or technology for storage of information, such as computer readable instructions, data structures, program modules, or other data. Memory device 606 may be implemented as a single storage device, but may also be implemented across multiple storage devices or sub-systems. Memory device 606 may comprise additional elements, such as a controller to read operating software 607. Examples of storage media include random access memory, read only memory, magnetic disks, optical disks, and flash memory, as well as any combination or variation thereof, or any other type of storage media. In some implementations, the storage media may be a non-transitory storage media. In some instances, at least a portion of the storage media may be transitory, but in no case is the storage media a propagated signal.

Processing circuitry 605 is typically mounted on a circuit board that may also hold memory device 606 and portions of communication interface 601 and user interface 602. Operating software 607 comprises computer programs, firmware, or some other form of machine-readable program instructions. Operating software 607 includes incident module 608, correlation module 609, and summary module 610, although any number of software modules may provide a similar operation. Operating software 607 may further include an operating system, utilities, drivers, network interfaces, applications, or some other type of software. When executed by processing circuitry 605, operating software 607 directs processing system 603 to operate computing system 600 as described herein.

In at least one implementation, incident module 608 directs processing system 603 to identify an incident in an IT environment, wherein the incident may be identified by monitoring systems of incident service computing system 600 or may be provided by SIEM or other similar external monitoring systems. In response to identifying an incident, correlation module 609 correlates the currently identified incident to one or more other incidents of the IT environment. In correlating the incidents, correlation module 609 may match at least a portion of the data from the identified incident to one or more other incidents that were previously identified for the IT environment. In some implementations, to match the data incident service may access an incident database that maintains data for incident identified in the environment and matches the data of the current incident to the data of the previously identified incidents. Accordingly, when two incidents match required data types, the incidents may be classified as correlated. In some implementations, in determining which incidents are correlated, correlation module 609 may maintain and receive correlation parameters, wherein the correlation parameters define requirements for two incidents to be correlated. In at least one example, the correlation parameters may be defined as a Boolean function. For example, incidents may be identified as correlated or similar if the sources of communications associated with the incident originate from a first country or a second country. In this manner, rather than matching data between the incidents, incidents may be correlated based on at least a portion of the data for the incidents matching or satisfying the correlation parameters.

Once events are correlated, summary module 610 generates a summary based on the aggregated incident, wherein the summary may be provided as a notification to at least one analyst associated with the incident. The notification may be provided as a text message, a popup notification, an email, or some other similar notification. The analyst to respond to the incident may be selected based the incident type identified from the aggregated data, may be based on the analyst responding to the other similar incidents, may be based on the schedule or work queue for the analyst or may be selected in any other similar manner. Once a notification is displayed for the at least one analyst, the analyst may select a response to at least the identified incident, wherein the response comprises at least one course of action.

Returning to the elements of FIG. 1, analyst systems 110-113, incident service 120, and incident database 150 may each comprise communication interfaces, network interfaces, processing systems, computer systems, microprocessors, storage systems, storage media, or some other processing devices or software systems, and can be distributed among multiple devices. Examples of analyst systems analyst systems 110-113, incident service 120, and incident database 150 can include software such as an operating system, logs, databases, utilities, drivers, networking software, and other software stored on a computer-readable medium. Analyst systems 110-113, incident service 120, and incident database 150 may comprise, in some examples, one or more server computing systems, desktop computing systems, laptop computing systems, or any other computing system, including combinations thereof.

IT environment 130 includes computing components 140-143, which may include physical computing systems (host computing systems, user devices, and the like), virtual computing systems, such as virtual machines and containers, routers, switches, and other similar computing systems.

Communication between analyst systems 110-113, incident service 120, incident database 150, and components within IT environment 130 may use metal, glass, optical, air, space, or some other material as the transport media. Communication between analyst systems 110-113, incident service 120, incident database 150, and components within IT environment 130 may use various communication protocols, such as Time Division Multiplex (TDM), asynchronous transfer mode (ATM), Internet Protocol (IP), Ethernet, synchronous optical networking (SONET), hybrid fiber-coax (HFC), circuit-switched, communication signaling, wireless communications, or some other communication format, including combinations, improvements, or variations thereof. Communication between analyst systems 110-113, incident service 120, incident database 150, and components within IT environment 130 may use direct links or can include intermediate networks, systems, or devices, and can include a logical network link transported over multiple physical links.

The included descriptions and figures depict specific implementations to teach those skilled in the art how to make and use the best mode. For the purpose of teaching inventive principles, some conventional aspects have been simplified or omitted. Those skilled in the art will appreciate variations from these implementations that fall within the scope of the invention. Those skilled in the art will also appreciate that the features described above can be combined in various ways to form multiple implementations. As a result, the invention is not limited to the specific implementations described above, but only by the claims and their equivalents.

What is claimed is:

1. A computer-implemented method, comprising:
    receiving, by an incident service computing system, information identifying a first incident associated with an information technology (IT) environment;
    obtaining, by the incident service computing system, first incident data associated with the first incident, the first incident data including a first incident data value, wherein the first incident data value is a numerical quantity;
    obtaining, by the incident service computing system, second incident data associated with one or more previous incidents that were previously identified for the IT environment and are associated with the first incident, the second incident data including a second incident data value, wherein the second incident data value is a numerical quantity;
    aggregating, by the incident service computing system, by summing a the first incident data value and the second incident data value, to obtain an aggregated data value, wherein the aggregated data value is a numerical quantity;
    generating, by the incident service computing system, an incident summary including a type of incident associated with the first incident and the one or more previous incidents, an identifier of a component of the IT environment affected by the first incident and the one or more previous incidents, and the aggregated data value;
    selecting a course of action to be performed based on information associated with both the first incident and the one or more previous incidents; and
    executing the course of action in the IT environment.

2. The computer-implemented method of claim 1, further comprising identifying a correlation between the first incident and the one or more previous incidents of the IT environment, wherein identifying the correlation between the first incident and the one or more previous incidents comprises determining that a quantity of data exceeds a predefined threshold amount, wherein the quantity of data is determined based on a match of at least a portion of the first incident data and at least a portion of the second incident data.

3. The computer-implemented method of claim 1, further comprising identifying a correlation between the first incident and the one or more previous incidents of the IT environment, wherein identifying the correlation between the first incident and the one or more previous incidents comprises determining that at least a portion of the first incident data matches at least a portion of the second incident data, and wherein the first incident data and the second incident data comprise one or more of internet protocol (IP) addresses, file types, file extensions, file sizes, executable processes, email addresses, user profiles, types of computing devices, identification of device failure, identification of network vulnerabilities, identification of service interruption, or identification of power outage.

4. The computer-implemented method of claim 1, further comprising identifying the type of incident associated with the first incident based on the aggregated data value.

5. The computer-implemented method of claim 1, further comprising:
    obtaining input indicative of one or more correlation parameters; and
    identifying a correlation between the first incident and the one or more previous incidents,
        wherein identifying the correlation between the first incident and the one or more previous incidents comprises:
        determining that at least a portion of the first incident data satisfies each of the one or more correlation parameters; and
        determining that at least a portion of the second incident data satisfies each of the one or more correlation parameters.

6. The computer-implemented method of claim 1, further comprising executing a second course of action to identify at least a portion of the first incident data.

7. The computer-implemented method of claim 6, wherein at least one step in the second course of action comprises transmitting a query to a web service to obtain the at least a portion of the first incident data.

8. A system comprising:
    a processor; and
    one or more non-transitory computer-readable storage media storing instructions that, when executed by the processor, cause the system to:
        receive, by an incident service computing system, information identifying a first incident associated with an information technology (IT) environment;
        obtain, by the incident service computing system, first incident data associated with the first incident, the first incident data including a first incident data value, wherein the first incident data value is a numerical quantity;
        obtain, by the incident service computing system, second incident data associated with one or more previous incidents that were previously identified for the IT environment and are associated with the first incident, the second incident data including a second incident data value, wherein the second incident data value is a numerical quantity;

aggregate, by the incident service computing system, by summing a the first incident data value and the second incident data value, to obtain an aggregated data value wherein the aggregated data value is a numerical quantity;

generate, by the incident service computing system, an incident summary including a type of incident associated with the first incident and the one or more previous incidents, an identifier of a component of the IT environment affected by the first incident and the one or more previous incidents, and the aggregated data value;

select a course of action to be performed based on information associated with both the first incident and the one or more previous incidents; and execute the course of action in the IT environment.

9. The system of claim 8, comprising further program instructions stored on the one or more non-transitory computer-readable storage media that, when executed by the processor, further cause the system to identify a correlation between the first incident and the one or more previous incidents of the IT environment, wherein identifying the correlation between the first incident and the one or more previous incidents comprises determining that a quantity of data exceeds a predefined threshold amount, wherein the quantity of data is determined based on a match of at least a portion of the first incident data and at least a portion of the second incident data.

10. The system of claim 8, comprising further program instructions stored on the one or more non-transitory computer-readable storage media that, when executed by the processor, further cause the system to identify a correlation between the first incident and the one or more previous incidents of the IT environment, wherein identifying the correlation between the first incident and the one or more previous incidents comprises determining that at least a portion of the first incident data matches at least a portion of the second incident data, and wherein the first incident data and the second incident data comprise one or more of internet protocol (IP) addresses, file types, file extensions, file sizes, executable processes, email addresses, user profiles, types of computing devices, identification of device failure, identification of network vulnerabilities, identification of service interruption, or identification of power outage.

11. The system of claim 8, comprising further program instructions stored on the one or more non-transitory computer-readable storage media that, when executed by the processor, further cause the system to identify the type of incident associated with the first incident based on the aggregated data value.

12. The system of claim 8, comprising further program instructions stored on the one or more non-transitory computer-readable storage media that, when executed by the processor, further cause the system to:
obtain input indicative of one or more correlation parameters; and
identify a correlation between the first incident and the one or more previous incidents, wherein identifying the correlation between the first incident and the one or more previous incidents comprises:
determining that at least a portion of the first incident data satisfies each of the one or more correlation parameters; and
determining that at least a portion of the second incident data satisfies each of the one or more correlation parameters.

13. The system of claim 8, comprising further program instructions stored on the one or more non-transitory computer-readable storage media that, when executed by the processor, further cause the system to execute a second course of action to identify at least a portion of the first incident data.

14. The system of claim 13, wherein at least one step in the second course of action comprises transmitting a query to a web service to obtain the at least a portion of the first incident data.

15. One or more non-transitory computer-readable storage media comprising:
program instructions stored on the storage media that, when executed by a processing system, cause the processing system to:
receive, by an incident service computing system, information identifying a first incident associated with an information technology (IT) environment;
obtain, by the incident service computing system, first incident data associated with the first incident, the first incident data including a first incident data value, wherein the first incident data value is a numerical quantity;
obtain, by the incident service computing system, second incident data associated with one or more previous incidents that were previously identified for the IT environment and are associated with the first incident, the second incident data including a second incident data value, wherein the second incident data value is a numerical quantity;
aggregate, by the incident service computing system, by summing the first incident data value and the second incident data value, to obtain an aggregated data value wherein the aggregated data value is a numerical quantity;
generate, by the incident service computing system, an incident summary including a type of incident associated with the first incident and the one or more previous incidents, an
identifier of a component of the IT environment affected by the first incident and the one or more previous incidents, and the aggregated data value;
select a course of action to be performed based on information associated with both the first incident and the one or more previous incidents; and
execute the course of action in the IT environment.

16. The one or more non-transitory computer-readable storage media of claim 15, comprising further program instructions stored on the storage media that, when executed by the processing system, further cause the processing system to identify a correlation between the first incident and the one or more previous incidents of the IT environment, wherein identifying the correlation between the first incident and the one or more previous incidents comprises determining that a quantity of data exceeds a predefined threshold amount, wherein the quantity of data is determined based on a match of at least a portion of the first incident data and at least a portion of the second incident data.

17. The one or more non-transitory computer-readable storage media of claim 15, comprising further program instructions stored on the one or more non-transitory computer-readable storage media that, when executed by the processing system, further cause the processing system to identify a correlation between the first incident and the one or more previous incidents of the IT environment, wherein identifying the correlation between the first incident and the one or more previous incidents comprises determining that at least a portion of the first incident data matches at least a portion of the second incident data, and wherein the first incident data and the second incident data comprise one or more of internet protocol (IP) addresses, file types, file extensions, file sizes, executable processes, email addresses, user profiles, types of computing devices, identification of device failure, identification of network vulnerabilities, identification of service interruption, or identification of power outage.

18. The one or more non-transitory computer-readable storage media of claim 15, comprising further program instructions stored on the one or more non-transitory computer-readable storage media that, when executed by the processing system, further cause the processing system to identify the type of incident associated with the first incident based on the aggregated data value.

19. The one or more non-transitory computer-readable storage media of claim 15, comprising further program instructions stored on the one or more non-transitory computer-readable storage media that, when executed by the processing system, further cause the processing system to:

obtain input indicative of one or more correlation parameters; and identify a correlation between the first incident and the one or more previous incidents, wherein identifying the correlation between the first incident and the one or more previous incidents comprises:

determining that at least a portion of the first incident data satisfies each of the one or more correlation parameters; and determining that at least a portion of the second incident data satisfies each of the one or more correlation parameters.

20. The one or more non-transitory computer-readable storage media of claim 15, comprising further program instructions stored on the one or more non-transitory computer-readable storage media that, when executed by the processing system, further cause the processing system to execute a second course of action to identify at least a portion of the first incident data.

* * * * *